Aug. 23, 1927. J. H. REEDY ET AL Re. 16,714
SOOT BLOWER
Original Filed Nov. 15, 1923
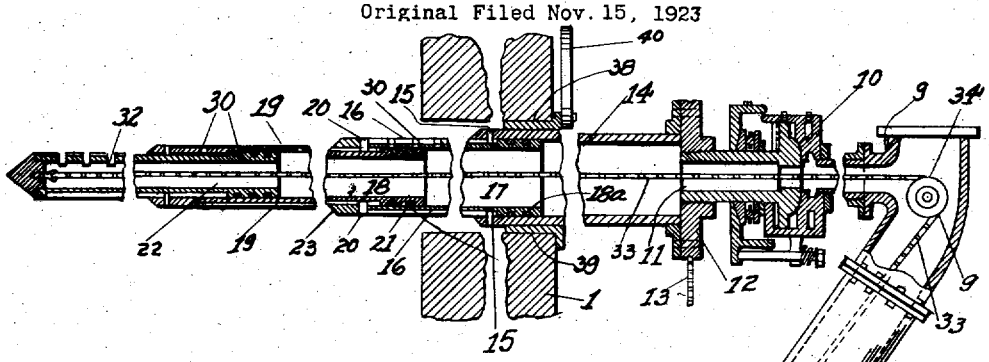
Fig 1
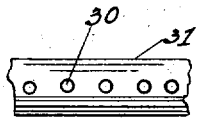
Fig 2
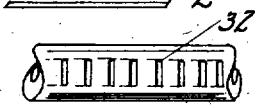
Fig 3
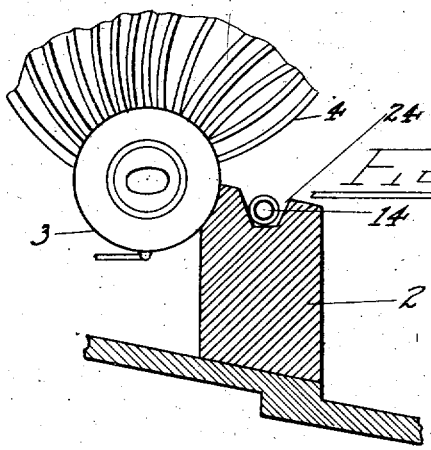
Fig 4
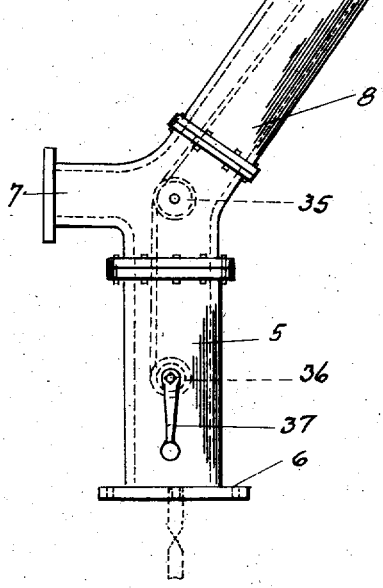
INVENTOR
John H. Reedy
William J. Rickert
BY Allen & Allen
ATTORNEY Reissued Aug. 23, 1927. Re. 16,714

UNITED STATES PATENT OFFICE.

JOHN HENRY REEDY, OF HAMILTON, AND WILLIAM JOSEPH LICKERT, OF CINCINNATI, OHIO.

SOOT BLOWER.

Original No. 1,591,779, dated July 6, 1926, Serial No. 674,982, filed November 15, 1923. Application for reissue filed November 9, 1926. Serial No. 147,346.

Our invention relates to soot blowers, a term applied to steam pipes which are employed to blow off the soot that accumulates on the tubes of a water tube boiler.

The disadvantage of the soot blowers with which we are familiar is that they are exposed to the high heat within the furnace, and hence have a rapid deterioration, and hence are a great expense in connection with the operation of boiler plants.

It is our object to provide a soot blower which is extensible, and can be stored outside of the combustion chambers of a furnace, and when in use can be extended, and rocked, turned or revolved, to blow off the accumulated soot and ash on the boiler tubes.

More specifically it is our object to provide a telescoping device which is extended by the force of the steam which is also used as an agent for blowing off the soot. Also it is our object to so form and mount and support the blower, that no metallic devices need be maintained as permanent equipment on the inside of the furnace.

We accomplish our objects by that certain construction and arrangement of parts to be hereinafter more specifically pointed out and claimed.

In the drawing:

Figure 1 is a vertical section of the device.

Figure 2 is a plan view of one form of blow hole of the device.

Figure 3 is a like view of another form of blow hole of the device.

Figure 4 is a partially diagrammatic view showing one mode of supporting the soot blower when extended into the furnace.

We have indicated the furnace wall at 1, and any bridge wall at 2. At 3 is indicated a boiler drum, and at 4 a set of tubes radiating or extending in any other accustomed manner therefrom.

As an outside support for the soot blower, we have shown a supply pipe 5, which has a base 6 for bolting down to any desired support. Ordinarily this support will be fixed to the furnace. Steam enters the device at T 7, from which extends the pipe 8. There is provided at the head of the pipe 8, a fitting 9, which is coupled to a revoluble packing joint 10. The details of this joint are not important except to the extent that it has steam packing, a revoluble outlet pipe portion or tubular element 11, and that there is a direct passageway through the coupling.

On the pipe portion 11 is mounted fast a sprocket wheel 12, on which is a chain 13. By means of the chain, the pipe 11 and the remainder of the soot blower is rocked, turned or revolved. The soot blower in the type shown has four straight telescoping tube sections. The outer or larger tube section 14 is secured fast to the sprocket wheel or in some other manner is rigidly secured to the revolving element 11 of the packing box. The section 14 has a pair of pins 15 projecting inwardly toward its center, at the outer end thereof, and these pins ride in grooves 16 in the outside of the next pipe or tube section 17. This pipe section has its grooves terminating in shoulders short of its end, and in the end thereof that lies permanently within the first section, are one or more packing rings, or piston rings 18*.

The third pipe or tube section 18, has like grooves 19 to engage pins 20 on the second section, and like piston rings 21. The fourth tube 22 is supported slidably in a steam tight manner, and held in positive alignment by means of pins, grooves and packing rings as in the case of the pipe section 18. Thus the several tubes interengage so that the telescoping device can be rotated to spray a wide area with steam.

It should be noted that section 22 is closed at its end, and has the end conical in shape. Also the ends of each pipe section which protrude are beveled off, as illustrated at 23.

By mounting the pipe or soot blower structure in line with a groove 24 in the bridge wall, or any kind of groove formed in a wall of the furnace, or any of its supports, bridges or baffles, it will be guided and supported when being extended. The beveled off advancing edges will not catch against any accumulation of dirt, protruding brick edge or the like. Also the blower can be removed or inserted in the boiler without interfering with its action.

Each of the sections of the telescoping structure will have a series of holes arranged along it, preferably in a straight line serving as means for permitting a discharge of steam therefrom. Thus we have shown the round form of holes 30, in any one of the sections typified at 31, or the holes may be elongated as illustrated at 32, in a typical section 31.

Secured to the outer end of the fourth section is a cable or chain 33, which extends back through the telescoping structure, over a sheave 34, down through the supporting pipe structure, around a sheave 35, and to a drum 36. The drum 36 may be rotated by hand, by means of a lever 37, mounted on the exposed end of its shaft. Ordinarily the drum will lie within the pipe, and the steam blowing through the pipe will not heat it enough to ruin the chain or drum, or its shaft.

While we have shown the first section as located well within the furnace wall, it will be understood that the device could be so mounted that the outer end of this pipe should lie within the mouth of the metal thimble 38. This thimble is secured in the hole 39 through which the soot blower passes into the furnace, and preferably does not extend through into the inside of the wall. If desired, the entire soot blower could be withdrawn from the furnace and the hole, for its introduction closed by any desired means, as by the cover 40. Also the entire device could be mounted on a movable stand, instead of being secured to the furnace, as will be apparent without illustration.

While the form of extensible blower shown, is the one we prefer, we do not wish to limit ourselves to this one form of providing for extensibility.

In operation the device is controlled as follows: The operator may make a preliminary rotary adjustment if he desires, and then turns on the steam. The steam presses against the end of the smallest tube, and extends it like a piston, and in like manner extends each of the tubes of the telescoping device. As any section is extended, the steam starts to escape through the spray holes in the section, thereby tending to retard the action of the steam to the end that too abrupt an extension of the device does not take place. When the device is fully extended within the furnace, the operator, leaving the steam turned on, rocks the structure to and fro, thereby spraying the soot away from the boiler tubes by means of the steam.

When the cleaning is complete, the steam is turned off, and the operator rewinds the reel device, thereby drawing in the several tube sections. As stated the degree of withdrawal of the sections from the furnace can be regulated as desired and also some other cleansing fluid besides steam could be employed.

Having thus described the invention, what we claim as new and desire to secure by Letters Patent, is:—

1. A boiler cleaner comprising a cleaning fluid supply pipe, a tubular element rotatably connected to said pipe and communicating therewith, means for rotating said element, a plurality of straight telescopic tubes normally nested within said element, interengaging means between adjacent tubes and between the outermost tube and said element to compel said tubes to share the rotary movement of said element, means enabling the pressure of the cleaning fluid to extend said telescopic tubes, means for retracting said tubes, said last means including a flexible element secured to the innermost tube and extending to a point of control adjacent said supply pipe, and means permitting the discharge of cleaning fluid from the several telescoping tubes.

2. A boiler cleaner comprising a steam supply pipe, a tubular element rotatably connected to said pipe and communicating therewith, means for rotating said element, a plurality of straight telescopic tubes normally nested within said element, interengaging means between adjacent tubes and between the outermost tube and said element to compel said tubes to share the rotary movement of said element, means enabling the pressure of the steam to extend said telescopic tubes, means for retracting said tubes, said last means including a flexible element secured to the innermost tube and extending to a point of control adjacent said supply pipe, and means permitting the discharge of steam from the several telescoping tubes.

3. In a soot blower, a tubular member located in the wall of a boiler, a series of straight telescoping tubes located within said tubular member with the outermost of the telescoping tubes keyed to said tubular member, means for keying each tube to another so as to maintain a slidable, but non-rotatable relation between them, means for extending the tubes and means for retracting the tubes each with relation to another so as to control the position of said tubes with relation to the tubular member, means for rocking the tubular member, means for injecting steam therein, and steam outlets located in spaced relation substantially throughout the series of tubes, so as to emit jets of steam substantially throughout the length of the telescopic structure, when the tubes are extended.

4. In a soot blower, a tubular member located in the wall of a boiler, a series of straight telescoping tubes located within said tubular member with the outermost of the telescoping tubes keyed to said tubular member, means for keying each tube to another so as to maintain a slidable, but non-rotatable relation between them, means for extending the tubes and means for retracting the tubes each with relation to another so as to control the position of said tubes with relation to the tubular member, means for rocking the tubular member, means for injecting steam therein, and steam outlets located in spaced relation substantially throughout the series of tubes, so as to emit jets of steam substantially throughout the length of the telescopic structure, when the tubes are extended, said steam outlets being in substantial alignment with respect to a plane crossing the axes of said tubes, whereby a steam spray may be directed in a plane extending radially from the axes of said tubes.

JOHN HENRY REEDY.
WILLIAM JOSEPH LICKERT.